United States Patent
Salot et al.

(10) Patent No.: US 7,939,195 B2
(45) Date of Patent: May 10, 2011

(54) STRUCTURED ELECTROLYTE FOR MICRO-BATTERY

(75) Inventors: Raphaël Salot, Lans en Vercos (FR); Frédéric Gaillard, Voiren (FR); Jean-Sébastien Danel, Echirelles (FR); Jean-Yves Laurent, Domene (FR)

(73) Assignee: Commissariat a l'Energie Atomique, Paris (FR)

( * ) Notice: Subject to any disclaimer, the term of this patent is extended or adjusted under 35 U.S.C. 154(b) by 961 days.

(21) Appl. No.: 11/311,578

(22) Filed: Dec. 14, 2005

(65) Prior Publication Data

US 2006/0154141 A1 Jul. 13, 2006

(30) Foreign Application Priority Data

Dec. 23, 2004 (FR) ..................... 04 53185

(51) Int. Cl.
*H01M 6/12* (2006.01)
*H01M 10/04* (2006.01)
(52) U.S. Cl. ............. 429/162; 429/161; 429/122
(58) Field of Classification Search .......... None
See application file for complete search history.

(56) References Cited

U.S. PATENT DOCUMENTS

| 5,314,765 | A | * | 5/1994 | Bates ................ 429/231.95 |
| 5,338,625 | A | * | 8/1994 | Bates et al. ................ 429/322 |
| 6,165,641 | A | | 12/2000 | Striebel et al. ................ 429/212 |
| 6,495,283 | B1 | | 12/2002 | Yoon et al. ................ 429/162 |
| 2003/0152815 | A1 | * | 8/2003 | LaFollette et al. ................ 429/7 |
| 2003/0175585 | A1 | * | 9/2003 | Ugaji et al. ................ 429/162 |
| 2004/0248010 | A1 | * | 12/2004 | Kato et al. ................ 429/231.8 |
| 2007/0134549 | A1 | * | 6/2007 | Nathan et al. ................ 429/149 |

FOREIGN PATENT DOCUMENTS

| WO | WO 99/65821 | 12/1999 |
| WO | WO 01/06578 | 1/2001 |
| WO | WO 2005/036711 | * 4/2005 |

OTHER PUBLICATIONS

Sharma, S. et al., "Diameter Control of Ti-Catalyzed Silicon Nanowires," Journal of Crystal Growth, Feb. 2004, pp. 613-618.
Tang, H. et al., "High Dispersion and Eletrocatalytic Properties of Platinum on Well-Aligned Carbon Nanotube Arrays," Carbon 42, Science Direct, Oct. 2003, pp. 191-197.

* cited by examiner

Primary Examiner — Keith Walker
(74) Attorney, Agent, or Firm — Nixon Peabody LLP

(57) ABSTRACT

In order to increase the capacity of an "all-solid" type micro-battery, the layer of electrolyte is structured: transversing cavities are created in the flat layer, advantageously at the level of patches of collector material, then filled by anode or cathode material.

11 Claims, 4 Drawing Sheets

STRUCTURED ELECTROLYTE FOR MICRO-BATTERY

CROSS-REFERENCE TO RELATED APPLICATION

This application claims priority to French Application No. 04 53185, filed on Dec. 23, 2004, entitled: "Structured Electrolyte for Micro-Battery" by Raphael Salot, Frederic Gaillard, Jean-Sebastien Danel and Jean-Yves Laurent and was not published in English.

TECHNICAL FIELD

The invention relates to the field of energy storage devices and principally micro-batteries manufactured in thin films by vacuum deposition techniques.

More specifically, the invention concerns a structuring of the electrolyte that makes it possible to increase the capacity of a battery by increasing the ion exchange surface of the electrodes. The invention further concerns a method enabling the manufacture of said micro-battery.

BACKGROUND ART

Among energy storage devices, some particularly used micro-batteries, known as "all-solid", are in the form of films: all of the components of the micro-battery, in other words the current collectors, the positive and negative electrodes, the electrolyte, and even the encapsulation, are thin films, obtained by deposition, principally by physical vapour deposition (PVD) or chemical vapour deposition (CVD). The techniques used enable objects of any shape to be formed.

As usual, the operating principle of such a battery is based on insertion and removal of an ion of alkali metal or a proton in and from the positive electrode, and deposition or extraction of said ion on and from the negative electrode; the principal systems use $Li^+$ as current carrying ion species. The recharging of a micro-battery, in other words the transfer of ions from the anode to the cathode, is in general complete after several minutes of charging.

Most current micro-batteries are formed in planar shape. Depending on the materials used, the operating voltage of this type of battery is between 1 and 4 V; the value of the operating voltage is only limiting for certain applications, such as sensors or actuators, which require voltages higher than several tens of volts.

The conventional surface capacity of an all-solid micro-battery is of the order of several 10 $\mu Ah/cm^2$ to several hundreds of $\mu Ah/cm^2$, which is low and remains a limiting factor for its use.

In order to increase the capacity, it is possible to increase the thicknesses of the electrode layers. However, the higher resistance linked to the diffusion of lithium throughout the material leads to poorer power performance.

Another solution proposed to increase the capacity without losing the power performance is the use of a larger developed surface. The document U.S. Pat. No. 6,495,283 thus describes a micro-battery in which one of the underlying layers, namely the substrate, the collector or the cathode, has a three-dimensional structure comprising cavities: the successive subsequent layers are deposited on the three dimensional structure, and thereby form layers of larger developed surface.

Nevertheless, with such a system, it is difficult to reach a high height to width ratio of the cavities: PVD techniques, in particular necessary for the electrolyte, do not enable a regular and homogeneous coating of the lateral (vertical) and base walls for cavities too deep and narrow. Moreover, the entire volume serving to define the three-dimensional structure is constituted by the material of the substrate, which is electrochemically inactive: the energy volume density is low.

DESCRIPTION OF THE INVENTION

The aim of the invention is to overcome the problems linked to the prior art with regard to the storage capacity and the power of the energy supply.

More specifically, the invention recommends the use of a structured electrolyte in an energy storage device. The layer of electrolyte, deposited flat by conventional techniques, is then machined in such a way as to include cavities crossing through it: said cavities are intended to receive the electrode materials. Thus, the ion exchange surface is increased, whereas the general size of the battery may remain similar and thereby as minimal as possible.

According to one of its aspects, the invention concerns a method for manufacturing a micro-battery comprising the creation of cavities in a layer of electrolyte and the filling of said cavities by a cathode and/or anode material. The filling of the cavities may be selective between anode and cathode, or it is possible to create the cavities in two steps and to fill them all each time.

Preferably, the cavities are hollowed out in places where the support of the layer of electrolyte comprises a collector material. Depending on the filling method, the collector material may be covered with catalyst, for example for a growth of carbon nanotubes or silicon nanowires.

It may also be advantageous to etch some of the electrodes, or all, filling the cavities between the upper surface and the base of collector material, and to fill said etching with collector material, in order to increase the collection surface. Another possibility for increasing the collection surface is to etch the electrolyte, for example near to some electrodes, or all, and to fill said etching with collector material.

Advantageously, once the cavities have been filled, the upper surface of the device is levelled off, and preferably coated with an encapsulation layer.

The invention for another aspect concerns a device that may be manufactured by the method described previously. In particular, the micro-battery according to the invention comprises a layer of electrolyte having cavities crossing through it. The anode and cathode elements of the energy storage device according to the invention are localised in the cavities of the layer of electrolyte. Advantageously, the electrolyte is a lithium oxynitride, preferably LiPON.

Preferably, the cavities extend normal to the surface of the electrolyte layer, and their section may be circular or rectangular or honeycomb. The anode and cathode elements are alternated, and do not protrude the layer of electrolyte; in particular, the cavities preferably form alternating strips.

Advantageously, the collector material is localised at the base of the cavities, and it may be chosen, depending on the electrode material and the method of filling, for example with a surface catalyst.

The energy storage device according to the invention may be encapsulated in order to isolate the ion exchanger elements from the exterior.

BRIEF DESCRIPTION OF DRAWINGS

The characteristics and advantages of the invention will be more fully understood on reading the description that follows and by referring to the appended drawings, given by way of illustration and in nowise limitative.

DETAILED DESCRIPTION OF SPECIFIC EMBODIMENTS

Figure 1A:
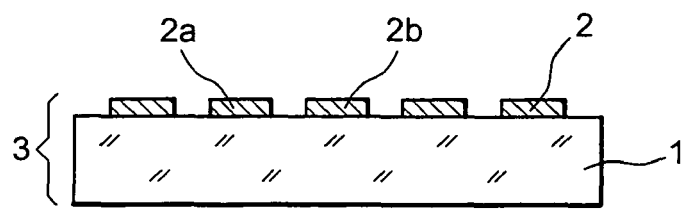
FIGS. 1A to 1G schematically illustrate a method of manufacture according to the invention.

An energy storage device normally comprises successive layers of: substrate, first collector material, first electrode, electrolyte, second electrode, second collector. These different elements can have a three-dimensional structure, for example in the case of micro-batteries such as those schematised in FIG. 1 of the document U.S. Pat. No. 6,495,283. Putting in place the layer of electrolyte is the limiting step of the method of manufacture for the increase of the developed ion exchange surface, in other words the relative surface of the anode and cathode compared to the size of the composite.

According to the invention, it is thus proposed to structure in three dimensions the micro-battery by means of the layer of electrolyte: the electrolyte may thus be put in place with conventional methods, particularly by PVD techniques, the actual increase of the exchange surface then being carried out on this base. By means of said method, one obtains micro-batteries in which the capacity is significantly increased, even if they may be of the same shapes and dimensions as existing ones.

In one embodiment of a method for manufacturing an energy storage device according to the invention, a conventional flat substrate 1 may be used, for example in silicon. Patches 2 of current collector material are then put in place on a surface of the substrate 1 (FIG. 1A); conventional techniques may be used, in particular the deposition with an appropriate mask, or photo litho etching. The patches thereby formed correspond to the anode 2a and cathode 2b collectors: it is possible if wanted to proceed in two steps if different materials are desired for each, or the same material may be deposited for the two electrodes. The shape of the mask or masks is also chosen depending on the future use of the micro-battery and the electrode and connectics geometry, as will become clearer below.

The support 3 thereby formed comprises a first surface alternating collector patches 2 and substrate 1.

An electrolyte layer 4 is put in place on the first surface. For example, a LiPON type electrolyte is deposited by PVD, whether by conventional radiofrequency deposition by magnetron, or by EBPVD (Electron Beam Physical Vapour Deposition) to gain in deposition speed.

The electrolyte layer 4 has a total thickness greater than that normally used; in particular, the distance h separating the first surface from the second surface of the electrolyte layer 4 corresponds advantageously to the normal thickness of micro-batteries, i.e. between 8 and 100 μm, preferably around 20 μm, whereas it is around 1 μm in a conventional architecture (where the electrolyte layer is deposited between the two electrode layers).

Figure 1B:
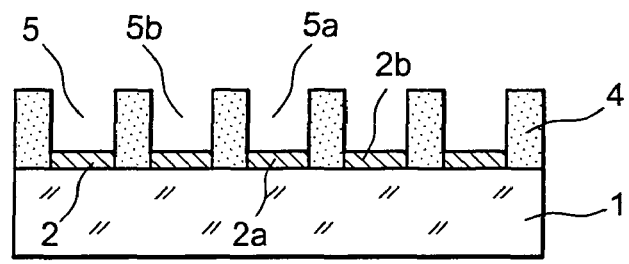

The layer of electrolyte 4 is then locally etched, preferentially by dry etching, down to the first surface of the support 3: FIG. 1B. It could also be envisaged to transfer onto a flat support 3 a solid electrolyte 4 in the form of a self-supporting film that has already been structured.

Advantageously, the cavities 5 created by the etching are all localised at the level of the patches 2 of collector material. An etching enabling a partial covering of the collectors 2 by the electrolyte 4, in other words cavities 5 of size less than the collector patches 2a, 2b, may prove favourable for better control of the electrode/electrolyte interfaces, particularly in the case of deposits by electrodeposition.

The cavities 5 may have varied shapes and sizes. Advantageously, the cavities 5 are perpendicular to the support 3, in other words vertical according to the graphic representation.

Figure 2A:
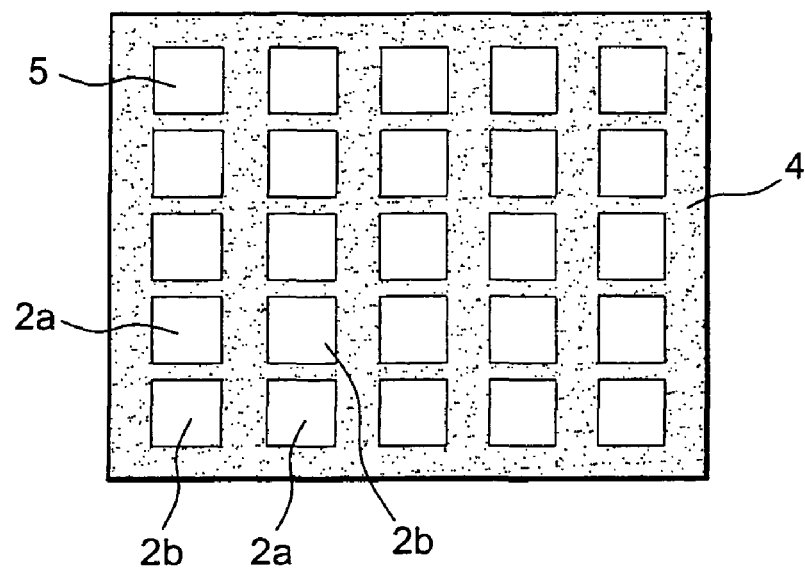
FIGS. 2A to 2E show electrolyte structuring architectures according to the invention.
Figure 2B:
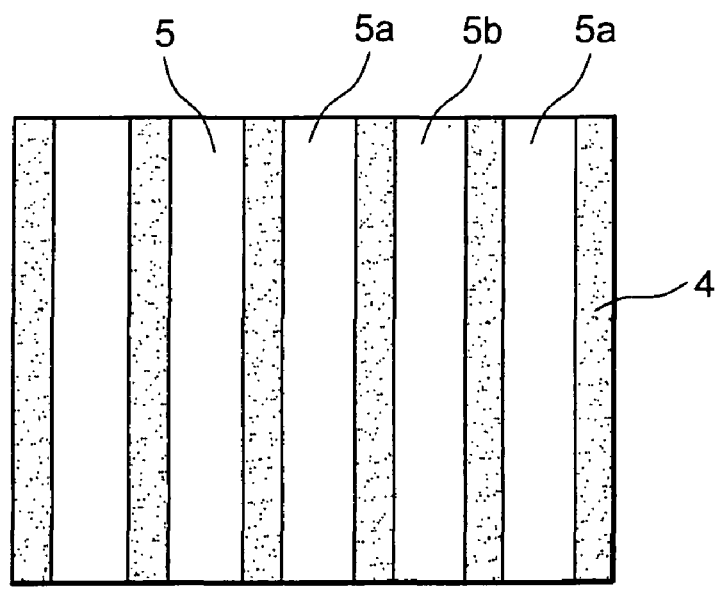

According to a preferred embodiment, the cavities 5 have a rectangular, square or circular section and are arranged in a regular square grid on the first surface (FIG. 2A); the diameter or side of the cavities 5 is for example 2 μm for a step of around 10 μm. According to another preferred embodiment, the cavities 5 extend longitudinally from one edge to the other of the substrate 3 and are parallel to each other (FIG. 2B), 2 μm wide and with a step of 10 μm, which can give rise to a connection of the electrodes in the form of overlapping combs.

Figure 2C:
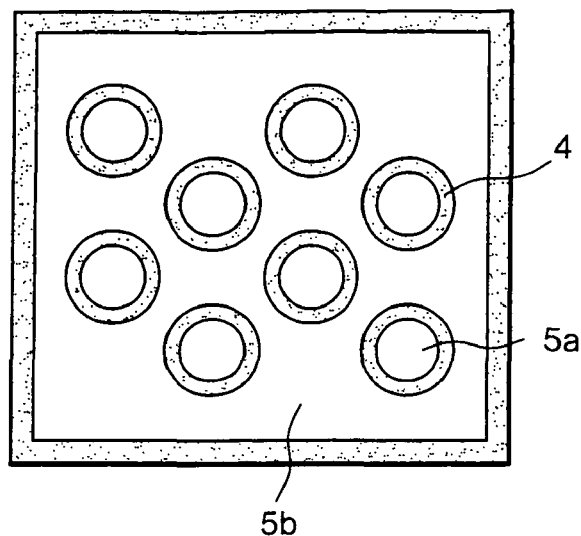
Figure 2D:
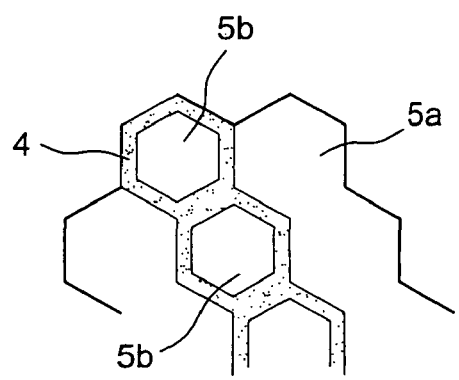

It is also possible to hollow out the electrolyte layer 4 in such a way as to only leave walls separating cavities 5a, 5b occupying the majority of the surface: see FIG. 2C. In this case in particular, a honeycomb structure (FIG. 2D), with size of cavities 5 of around 8 to 10 μm for example, further makes it possible to rigidify the structure of the electrolyte 4 for the remainder of the method of manufacture. Compared to the honeycomb structure represented in FIG. 2D, a structure in the form of squares or truncated squares (not illustrated) would further make it possible to maximise the exchange surface between cathode and anode.

Figure 2E:
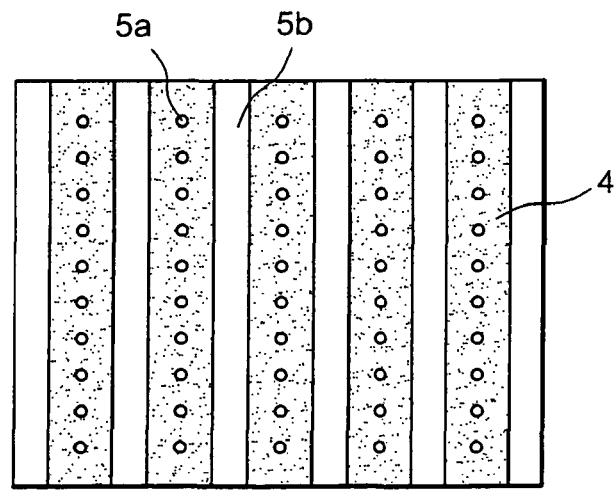

Any other geometry, regular or not, is obviously possible. In particular, one may choose a certain shape for the cavities 5a, corresponding to the patches 2a of anode collector, such as cylinders, in which a growth of nanotubes could be carried out, and another geometry for the cavities 5b corresponding to the future cathode elements, for example longitudinal slots (FIG. 2E).

It is advantageous that the ratio between the developed surface of the layer of electrolyte 4 and the second surface is greater than five, for example around ten, or even more, in other words that the cumulated surface of the vertical walls of the cavities 5 is greater than or equal to four times the surface of the substrate 3.

The electrode elements are then put in place by filling the cavities 5.

Figure 1C:
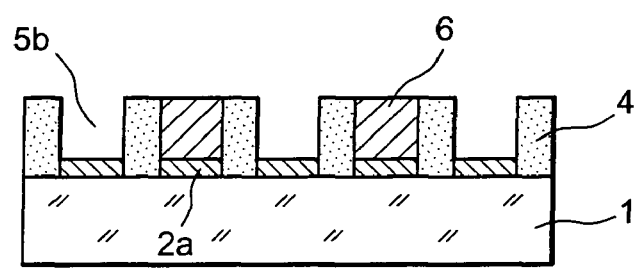
Figure 1D:
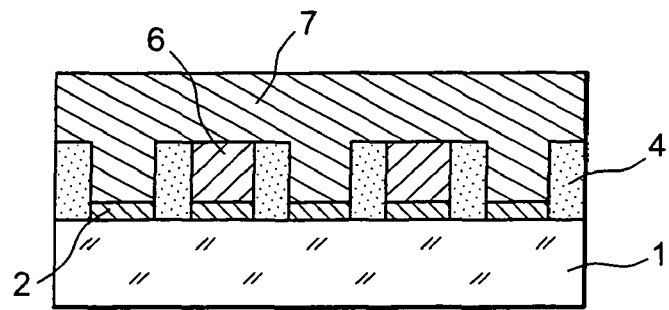

According to a first embodiment, a first electrode 6 is initially deposited in some first cavities 5b (FIG. 1C). For example, if the electrode element 6 fills the cavity by electrodeposition, the method implies the application of a voltage at the place where the deposition takes place: it is possible to select among the cavities 5 those 5b that will be filled by the first electrode 6, for example a cathode in $LiCoO_2$. Then, the second electrode 7 is put in place, for example by CVD techniques, in the other second cavities 5a that have not been filled, and possibly above the whole assembly: FIG. 1D.

Although the previous type of deposition limits the number of etchings of the electrolyte layer 4, it is also possible to use a method for putting in place the first electrode 6 that is not selective, for example a CVD. In this case, the electrolyte layer 4 may be etched in several steps: a first etching frees the cavities 5b filled by the first electrode 6, then the electrolyte layer 4 is etched a second time to form the second cavities 5a that will be filled by the second electrode 7.

The filling of the cavities 5 may be carried out by growth of nanotubes or nanowires.

During the deposition of the electrode elements 6, 7, the layer of electrode material may have a thickness greater than the depth h of the cavities 5. The extra thicknesses are in this case eliminated, by etching or polishing, before the subsequent steps.

Figure 1E:
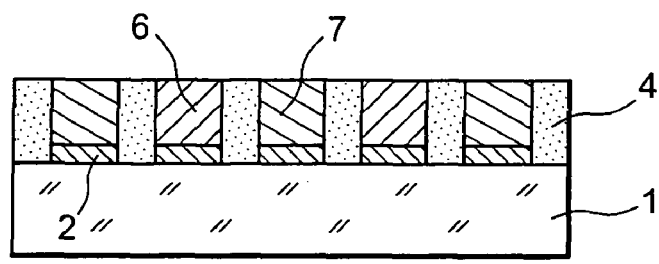
Figure 1F:
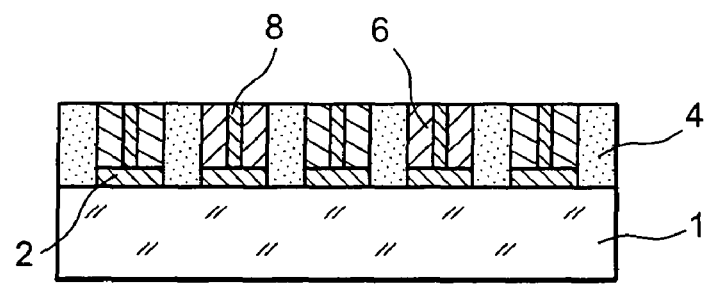

The surface opposite the support 3 is preferably made flat, in such a way that the second surface is parallel to the first surface of the substrate 1: FIG. 1E.

In a specific case, the layers of electrodes 6, 7 filling the cavities, or only some of them, may also be etched in order to deposit, in their middle region for example, a collector material 8, the same as that 2 present at the base of the cavity 5 preferably. Thanks to this step (FIG. 1F), the contact surface between current collector 2, 8 and electrode 6, 7 is increased, and the path of the electrons in the electrode material is reduced. This geometry is advantageous, particularly in the presence of high current densities, and makes it possible to avoid the limitations for a correct power operation since the flow rate is not restricted.

Another interesting possibility in this respect is to etch from the start of the method the electrolyte 4 and to fill these etched zones with collector material 8 that will make electrical contact at the bottom of the etching on a collector zone 2.

Figure 1G:
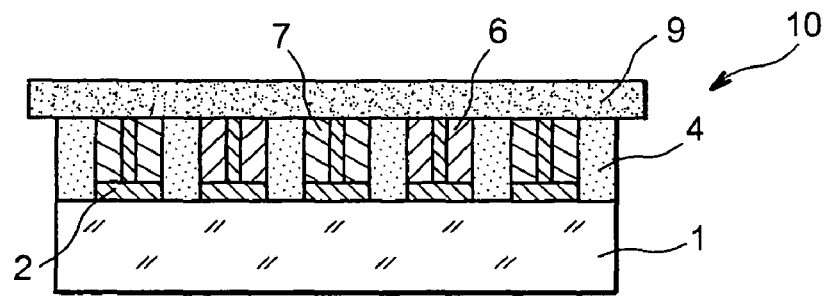

It is advantageous to conduct the encapsulation of the device thereby formed, for example by depositing on the second surface a thin parylene/aluminium/parylene type film 9: FIG. 1G.

The materials used in a method and for a device 10 according to the invention may be various and may be put in place according to any known technique, in particular:

- The current collectors 2, 8 are metallic and may be for example depositions based on Pt, Cr, Au, Ti. In particular, as regards step 1F, an electrodeposition or a MOCVD (Metal Organic Chemical Vapour Deposition) may be envisaged.
- The positive electrode 6 may in particular be composed of $LiCoO_2$, $LiNiO_2$, $LiMn_2O_4$, $CuS$, $CuS_2$, $WO_yS_z$, $TiO_yS_z$, $V_2O_5$, deposited by conventional technique, with if necessary a thermal annealing to increase the crystallisation and the insertion capacities (particularly for lithium oxides).
- The negative electrode 7 may be metallic lithium deposited by thermal evaporation or a metal alloy based on lithium. However, the anode 7 preferably comprises a material that is capable of inserting lithium: germanium, Si—Ge, silver, tin, SiTON, $SnN_x$, $InN_x$, $SnO_2$, etc. and in particular silicon or carbon.
- The electrolyte 4 is a good ionic conductor and an electronic insulator, for example a vitreous material based on boron oxide, lithium salts or oxides, in particular a lithium oxynitride. Preferably, the electrolyte is based on phosphate, such as LiPON, or LiSiPON.
- The encapsulation layer 9, the purpose of which is to protect the active elements 4, 6, 7, 8 from the external environment, and specifically moisture, may be formed from polymer (such as hexamethyl disiloxane or parylene), ceramic or metal, as well as by superimposition of layers of these different materials.

According to a preferred embodiment, the anode 7 is composed of carbon nanotubes, or silicon nanowires. In this case, advantageously, the contact face of the collector material 2a and the electrode 7 comprises a catalyst for growing nanotubes or nanowires, such as for example Ni or Co. For example the methods described in the documents of Sharma S et al. ("Diameter control of Ti-catalyzed silicon nanowires", *J Crystal Growth* 2004; 267: 613-618), or Tang H et al. ("High dispersion and electrocatalytic properties of platinum on well-aligned carbon nanotube arrays", *Carbon* 2004; 42: 191-197) may be used.

In the case where the application so allows, crystallised electrolytes 4, of the type $Li_{1+x}Cr_xGe_{2-x}(PO_4)_3$ or $(Li_{0.5}La_{0.5})TiO_3$, requiring a thermal annealing, may be used. The annealing may then be carried out prior to the etching or the deposition of the electrode material, or combined with the operation of depositing one of the electrodes or both: since CVD methods often require the substrate 3 to be heated, the crystallisation of the electrolyte 4 takes place in a concomitant manner.

The method according to the invention makes it possible to obtain a battery 10, the architecture of which is novel, the electrolyte layer 4 comprising transversing cavities 5 in which the electrodes 6, 7, normally comprising distinct electrode elements, are localised. Since the exchange surface is increased, for example by a factor of five or ten, compared to a flat architecture, the capacity of the storage devices 10 according to the invention is increased. Indeed, unlike existing systems in which the surface is artificially increased by creation of trenches, the micro-batteries according to the invention are arranged perpendicularly to the substrate 1, which optimises the effective surface.

Moreover, said structure makes it possible to define, on a same substrate, a multitude of individual batteries that then constitute a matrix enabling connections in series or in parallel depending on the chosen application: this architecture makes it possible to form couplings of different forms between the positive 2b and negative 2a current collectors. It is thereby possible to obtain high voltage systems by means of a coupling in series of the collector patches 2, or high capacity systems by coupling the electrodes 6 and 7 in parallel: a simple change of the mask used to put in place the first layer of material, namely the current collector 2, makes it possible to form different systems by the same method and with the same parameters. This thereby enables the reuse, advantageously economically, of levels of existing masks.

A network of micro-switches may also be coupled to the matrix of batteries, enabling a change of the types of connections on request.

The recovery of negative or positive electrode contacts (connectics) is specific to each type of structure. For example, for "comb shaped" connectics, the current collectors may be formed directly on the substrate if said substrate is electronically insulating. For a square network, square shaped connectics are made in the form of buried via holes in order to transfer the contacts to an exterior zone without creating short-circuits.

Among the targeted applications, apart from chip cards and "intelligent" labels, which enable for example the recurrent measurement of parameters by miniaturised implants, figures the supply of Microsystems. Such applications require that all of the layers necessary for the operation of the battery are manufactured with techniques compatible with industrial microelectronic methods, which is the case of the device and the method according to the invention.

The invention claimed is:

1. Energy storage device comprising:
    a support substrate having a first surface;
    a plurality of collector patches disposed on the first surface of the support substrate such that portions of the first surface are contacted by the plurality collector patches and portions are uncontacted by the plurality of collector patches;
    an electrolyte layer disposed on the support substrate, the electrolyte layer resting on the uncontacted portions of the first surface and having gaps in electrolyte material, each gap entirely overlying at least a portion of a corresponding collector patch;
    and a plurality of cathode and anode electrode elements alternately disposed in the gaps of electrolyte material on corresponding collector patches wherein the gaps of electrolyte define cross sections of electrode element-filled cavities formed in the electrolyte layer, said gaps having walls extending orthogonally from the first surface of the support substrate, the walls having a cumulated surface greater than or equal to four times the first surface of the support substrate.

2. Device according to claim 1 wherein the gaps in electrolyte material are of rectangular or round section, or arranged in a honeycomb pattern.

3. Device according to claim 1 wherein the gaps in electrolyte material are strips.

4. Device according to claim 1 wherein the collector patches comprise collector material, the device further including additional collector material extending from the collector patches into electrode elements.

5. Device according to claim 4 wherein a contact face of some electrode elements and collector material includes a catalyst.

6. Device according to claim 5 wherein the electrode elements having a contact face with collector material that includes a catalyst comprise nanotubes or nanowires.

7. Device according to claim 1 wherein the anode electrode elements are composed of carbon or silicon.

8. Device according to claim 1 wherein the electrode elements fill the gaps.

9. Device according to claim 8 further comprising an encapsulation layer.

10. Device according to claim 1 wherein the electrolyte layer comprises a lithium oxynitride.

11. Device according to claim 10 wherein the lithium oxynitride of the electrolyte layer is phosphate based.

* * * * *